United States Patent Office 3,078,249
Patented Feb. 19, 1963

3,078,249
MONOLITHIC CAST OBJECTS AND METHOD
Alexander H. Russell, Baltimore, Md., assignor to Spectra-Cast Corporation, Baltimore, Md., a corporation of Maryland
No Drawing. Filed Feb. 1, 1957, Ser. No. 697,505
2 Claims. (Cl. 260—40)

This application is a continuation-in-part of my copending application, Ser. No. 498,770, filed April 1, 1955, now abandoned.

The present invention relates to novel monolithic cast resinous articles or products and to a novel method of producing such articles. More particularly, the invention relates to monolithic cast articles comprising a resinous binder and a high percentage of inert filler material, and to the novel method of producing such articles.

One object of my invention is to provide novel monolithic cast resinous units or articles having high compression strengths, which are rigid and have a hardness which has not heretofore been obtained in resinous cast articles.

It is another object of my invention to provide novel cast resinous articles which additionally possess a hard, decorative, serviceable and smooth surface and which are substantially impervious to moisture and staining.

It is a further object of my invention to provide a novel monolithic cast resinous article which does not require internal or external reinforcing structures and which contains a high percentage of inert filler material.

It is also an object of my invention to provide a novel process for producing flat monolithic cast resinous articles which are surprisingly free from warpage.

These and other objects of the invention will be better understood from a reading of the specification which follows.

The novel monolithic cast resinous articles of the present invention may be produced in rigid forms which do not require internal or external support members as has been the practice in the case of similar large cast resinous units produced in accordance with the usual commercial prior art practices. These units which may take the form of laundry tubs, utility tubs, wall and floor tiles, road markers, table tops, window sills, sign-board letters, etc., are extremely rigid and possess excellent dimensional stability, compression and tensile strengths and provide an attractive, colorful, durable, hard finish having excellent stain and moisture resistance. These units are produced by molding or casting a pre-mixed resinous composition containing a high proportion of an inert filler material, particularly sand, in a mold which conforms generally to the configuration of the object to be cast. After completing the molding or casting of the desired object the parts of the mold are removed and the operation is completed. The mold may be constructed of various rigid or semi-rigid materials, such as stainless steel, glass, wood, or other compositions having rigid characteristics. The mold may be coated with a glass, enamel, frit or porcelain as desired, or alternatively the mold may be coated with an anti-sticking composition having a high surface tension, such as Teflon.

The monolithic rigid cast article which is obtained by the process of the present invention may be produced within uniform, fine tolerances to provide an object which is dimensionally uniform and which possesses excellent dimensional stability.

The molding or casting of the units of the invention is accomplished by curing the resinous compositions of the present invention in the mold either at room temperature or at an elevated temperature until hard. The time required will vary in accordance with the resinous composition employed and upon the temperature employed during the curing operation. When heated to a temperature of about 200° F., compositions in accordance with the invention may be cured in about 2 hours, whereas at room temperature from 6 to 48 hours are generally required.

The present invention finds its greatest utility in producing rigid cast units which are at least ⅛ of an inch, and preferably ¼ of an inch, in every dimensions, and one dimension is 4 inches or more, and preferably more than one foot, in length. One of the remarkable features of the cast objects of the present invention is that large units, such as laundry tubs, may be produced having a thickness of about ¼ of an inch to ¾ of an inch or more which have extreme rigidity, durability and possess high compression and tensile strengths and which do not require the employment of metal retaining or reinforcing members. Large cast objects have been produced by the prior art employing resinous materials containing expensive fiber-glass reinforcing material but, so far as I am advised, large units, such as laundry tubs, produced from these materials require a metal supporting basket or the use of a metal reinforcing skeleton. The necessity of employing supporting and reinforcing construction increases the cost of producing such units to a prohibitive degree. The present invention obviates the necessity of such reinforcement and this provides one of the principal advantages of the cast articles of the present invention.

The exact procedure of molding the cast objects of the present invention may vary substantially, depending upon the nature and size of the unit to be produced. Generally speaking, the mold operation comprises placing resinous compositions in accordance with this invention within the confines of a mold which has an internal configuration or face corresponding to the external configuration of the object to be produced. The mold may be shaped from a single sheet of metal or other material to have but one face or surface corresponding to the configuration of the unit to be cast. Such a mold is particularly satisfactory for producing objects such as wall and floor tiles, road markers, table tops, window sills, sign letters, and the like. Such molds have one surface which is not closed. In the case of more complex objects, such as laundry tubs or utility tubs, it is desirable to employ a two-piece or two-faced mold, such as one having male and female parts.

In the molding of complex units such as laundry tubs or utility tubs I found it desirable to position the male component face upward so that the surface corresponding to the internal surface of the bottom of the tub to be molded is placed facing upward. If desired, a metal drain pipe may be placed in position on top of the male mold component. Over the male component is placed a corresponding female component which generally conforms to the configuration of the male component and when placed in position provides a cavity of uniform thickness of from about ¼ of an inch to ¾ of an inch, or any other thickness which may be desired. That part of the female component which corresponds to the outer surface of the bottom of the tub is desirably partially cut away so as not to interfere with the positioning of the metal drain pipe and to permit the pouring of the resinous molding composition into the mold cavity and around the drain pipe. After curing the molding composition, the two faces of the mold are separated and the cast article is finished. The drain pipe is molded into position at the bottom of the tub. It will be recognized, of course, that other molding techniques may be employed, depending upon the object to be produced.

A wide variety of resinous molding or casting compositions may be employed in the production of cast objects in accordance with this invention. The resinous molding compositions which are most desirable include a polymerizable organic resin such as a polyester type of resin or an Epon type, whatever catalyst may be necessary to produce curing of the resin, a monomeric polymerizable solvent which does not volatilize when the resin is cured, and which will assist in cross-linking the resin during curing, one or more suitable, finely-divided fillers or aggregates, and desirably a suspending material, an anti-foaming agent, and pigment or coloring material where suitable.

The polyester resins are a class of resins with which the resin chemist is familiar. These are ethylenically unsaturated alkyd resins. The preferred resins of this class for employment in the coating compositions of the invention are the polymeric ester reaction products of one or more dicarboxylic acids and one or more polyhydric alcohols. Desirably one or more of these reactants shall contain a reactive double bond or ethylenic linkage. Among the dicarboxylic acids which may be used are phathalic, malic, maleic, fumaric, adipic, pimelic, suberic, sebacic, itaconic, citraconic, and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is the most satisfactory polyhydric alcohol. One may use an unsaturated monohydric alcohol in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired. The polyesters should comprise upward from about 15% to 30% and preferably 50% to 85% by weight of the resin and resin forming component, e.g., styrene, of the coating composition.

The resin component of the preferred coating compositions should also contain a non-volatile, monomeric, cross-linking solvent for the polyester resin or other resin employed. The function of this solvent is to make the polyester resin more fluid so that the molding composition may be more easily poured into the mold and also to cross-link the polyester resin at the time of curing to produce a cross-linked, or three-dimensional final resin with the polyester resin which is thermosetting in character. This monomeric solvent is an important member of the resin component, for it provides the necessary fluidity to the molding composition, imparts thermosetting characteristics to the cured resin and is consumed during the curing of the resin without forming volatile materials. This freedom from volatility is highly important for otherwise the release of volatile matter would produce bubbles, voids or pinholes on the surface and throughout the monolithic cast article. The lack of volatile matter permits curing without requiring provision for vents, etc., in the molds. Also, escaping combustible, volatile matter might produce explosions, or fire hazards.

Among the monomeric polymerizable solvents which may be used are the hydrocarbons: styrene, vinyl toluene and cyclopentadiene; vinyl acetate; diallyl phthalate and triallyl cyanurate. Styrene has produced the most satisfactory results thus far.

When obtained commercially, the polyester resin compositions usually also contain a small amount of a polymerization inhibitor so as to prevent gelation during storage prior to usage. Such inhibitors include the well-known antioxidant: hydroquinone, t-butyl catechol, quinone, etc.

Polyester resins of the character contemplated for use in the process of the present invention are sold in the trade and identified as "Paraplex" or "Vibrin" resins. In general, these resins are unsaturated high molecular weight polymers made by reacting one or more acids or a blend of acids, such as maleic or fumaric acid, with a dihydroxy alcohol, such as ethylene glycol. The specific properties of these resins vary depending largely upon the type and amount of each constituent in the combination. For best results it is preferable to employ a mixture of two different types of such resins. Certain of these resins form masses upon curing that are very rigid or inflexible, while others form more flexible rubbery masses. It is preferred to use a mixture of the rigid and flexible resins, and about two to five parts of rigid resin and one part of flexible resin produce excellent results. These proportions may, of course, be varied within wide limits depending upon the particular properties desired for the cured cast article and the properties of the resins that are mixed. One of the advantages of employing such mixtures is that in casting flat objects such as table tops, floor tiles and the like from them, the inherent tendency of flat objects to warp during casting is greatly reduced. This advantage is illustrated by Example 5 hereinbelow.

The polyester resin and the monomeric polymerizable solvent (such as styrene or vinyl monomer, such as vinyl acetate and vinyl toluene) are first mixed together along with any suspending agent, catalysts, anti-foaming agents and coloring agents to form an "initial liquid resin mixture" which is later to be mixed with the inert, finely-divided filler to form the molding composition. This initial liquid resin mixture shall desirably contain a ratio of about 40 parts and preferably 50 to 80 parts of polyester resin and the balance styrene or other solvent for each 100 parts of combined resin and styrene or other solvent. A ratio of 60 parts polyester resin and 40 parts styrene gives a good workable consistency to the initial liquid resin mixture and the final molding composition.

A suitable catalyst should be added to the initial liquid resin mixture just prior to the addition of the filler, or after the addition of the filler, but just prior to the molding operation. The molding operation should be initiated within a short period of time after the addition of the catalyst to the mixture containing the resin, otherwise the mixture may become too viscous for convenient charging of the mold as a result of premature polymerization.

A large number of oxidizing catalysts such as hydrogen peroxide, benzoyl peroxide and the like, with which those skilled in the resin art are familiar, may be used satisfactorily. I prefer to employ methyl ethyl ketone peroxide. The optimum concentration of methyl ethyl ketone peroxide is about 2% of the resin weight whereas the general practice in the art for these catalysts is the use of an amount of from 0.5% to 2%. The catalyst concentration to be used is greatly dependent upon the speed desired for curing.

The use of metallic driers in combination with the peroxide catalysts, and particularly with either benzoyl peroxide or methyl ethyl ketone peroxide, is desirable. When, for example, methyl ethyl ketone peroxide or benzoyl peroxide and manganese and cobalt naphthenates are used together in the proportions of about 1% of the peroxide and about 1½% of the naphthenates by weight of the resins, excellent results are obtained.

The metallic driers discussed above are materials with which those skilled in the art, and particularly in the paint art, are familiar. These materials are metal salts of an organic acid, such as naphthenic acid. The primarily important driers are cobalt, manganese and iron naphthenates. I prefer to use manganese naphthenate, which is desirably introduced in the form of a 6% solution, as the drier.

It has been found to be desirable to incorporate a suspending agent into the initial liquid resin mixture. The preferred suspending agents are the cation modified clays, such as are disclosed in U.S. Patent No. 2,531,427 which issued on November 28, 1950, to Ernst A. Hauser. These cation modified clays are essentially clays, such as bentonite, which normally possess cation exchanging properties and which have in place of the normal exchangeable cation an onium base. Such onium base derivatives of the clays are the ammonium, phosphonium, oxonium, sulfonium, arsonium, stibonium and telluronium derivatives. The ammonium base clays are preferred. Excellent results have been obtained by incorporating about 2% to 10%, and preferably 3%, by weight of dimethyldioctadecylammonium bentonite per weight of the total molding composition. This particular onium base derivative is supplied by the National Lead Company under the trade name "Bentone 34." This material has a specific gravity of 1.8 and is desirably of a small particle size, such as 0.05 to 1.0 micron in length.

The employment of these cation modified clays imparts a suspending action upon the high percentage of inorganic filler and prevents it from settling out before the molding composition has undergone an initial curing and has begun to solidify. This provides a homogeneous cast object.

It may be desirable to add additional ingredients to the molding composition to insure the production of a surface that is non-combustible. This property will not always be required, however, so that such additions are entirely optional. The addition of antimony trioxide and chlorinated paraffins even in small amounts is sufficient for this purpose, although other materials such as tricresyl phosphate may be used in place thereof.

The incorporation of an anti-foaming agent into the composition is highly important if the formation of air bubbles is to be minimized. Best results to date have been obtained with Dow-Corning Antifoam A. An amount of about 0.2% to 0.5% of the resin provides satisfactory results in most cases.

The filler to be added to the initial liquid resin mixture described above to form the molding compositions from which the cast articles of the present invention may be formed may vary in kind and amount. The filler may include such chemically-inert, finely-divided materials as the calcium carbonates, clays, burned clays, glass beads, asbestine, diatomaceous earth, silica flour, sand, gravel, inert minerals and other natural or manufactured granular particles which may be blended together. The filler is a critical component of the molding compositions since it provides, in a sense, a diluting medium enabling savings of the more expensive polyester resins and also contributes very desirable properties of its own which are essential for a satisfactory monolithic cast object according to this invention. Sand is excellent for this purpose and it greatly increases the hardness, compression strength and other unique properties of my cast articles. An additional important property provided by the employment of large concentrations of sand is that shrinkage in the mold is reduced. This is important in molding an object in a mold having internal protrusions as it minimizes cracking or shattering of the cured article. The employment of a large proportion of sand filler constitutes an important feature of my invention.

It is desirable that the filler used consist of rounded particles. Rounded particles will nest more closely together than will rough, irregular shaped particles. Rounded particles will slide past one another more readily than rough, irregular particles and are thus extremely beneficial in enhancing the flowability of the molding composition in charging the mold. Because of this latter property they permit substantial savings in the amount of polyester resins required, as it becomes possible to increase the filler concentration and yet obtain excellent flowability. It is for this reason that sand is a preferred source of filler, for most sand particles are more smooth and rounded than are many of the other filler materials.

By employing sand having a gradation of particle sizes a number of advantages may be obtained. It is advantageous to be able to use a molding composition having the greatest possible ratio of filler to resin. Not only are the resins substantially more expensive, but, as has been stated above, the sand contributes essential properties to a satisfactory cast article. By using a gradation of particle sizes one can increase the amount of filler from as much as 40% to 400% or 500% per weight of the initial liquid resin component without sacrificing any process economies or flowability of the molding composition and yet obtain a cast object having superior properties. By using a gradation of particle sizes, it is possible to obtain filler material which approaches maximum density by reducing the open void spaces between the filler particles to a minimum. This makes it possible to use a small amount of resin in filling the voids and yet provides a rugged, hard and strong cast article.

Satisfactory results have been obtained when using sand having a maximum particle size of a 30-mesh sieve.

In practice, desirable results may be obtained by using particles having at least 2 general particle size classifications, one of which may be said to be of large size (in the order of 30–70 mesh) and another of small size (in the order of 100–325 mesh). It is desirable to employ a major proportion, and preferably 60% or more, by weight of the large size particles. One particularly successful gradation is one in which about 65% by weight of the filler is of sand of approximately 40–70 mesh and 35% is of 70–140 or 70–200 mesh size. A gradation of 80% of the former mesh size and 20% of the latter is equally satisfactory.

It has been found that it is particularly desirable in the coating mixture to employ at least about 50% by weight of sand up to about 80%, and at least about 10%, and desirably more than 20%, by weight of the resin solids and polymerizable solvent, if one is to obtain the most satisfactory properties in the cast articles. That is, the sand is present in an amount of at least about 50% and not over 90% of the total of the resin, polymerizable solvent and sand by weight.

I have also discovered that when it is desired to produce cast flat objects such as wall and floor tiles, i.e., thin flat objects having at least one dimension substantially greater than another, it is advantageous to place over the slurry of resinous casting compositions described above in the mold, a layer of finely-divided, inert filler material, such as sand, before completing the curing of the casting composition. I have found that the application of a separate layer of finely-divided, inert filler to the resinous casting compositions substantially eliminates warpage of the object during curing of the casting composition and any subsequent cooling. As is well known to those skilled in the art, thin flat objects produced by casting resinous compositions have a tendency to warp during the casting and cooling treatments. The application of a separate and additional layer of finely-divided filler to the resinous casting compositions of this invention reduces this difficulty without any substantial diminution of the mechanical strength of the cast object or detrimental effect upon its appearance. The amount of added filler or sand which may be employed will depend upon the viscosity of the resinous casting composition. With more viscous casting compositions, less added dry sand may be used. Generally, enough added dry sand may be employed so that the total sand or filler in the mold is up to 9 times, and preferably about 6 to 8 times, of the amount by weight of resinous components. There is no minimum amount of added sand that may be used, but as the art will recognize, unless significant amounts are used, the full advantages of this feature of the invention will not be achieved. Preferably about 2 parts by weight of dry sand are added for each part of resinous casting composition containing about 3.2 parts of sand for each part of resinous components. After the application of the separate layer of dry sand, the mold and its contents are desirably vibrated to bring the sand into more intimate contact with the slurry of resinous casting composition. After curing, the cast object is removed from the mold in the usual manner.

As will be appreciated, the application of a separate and additional quantity of sand to the surface of the slurry of resinous casting composition provides additional economy in the use of larger amounts of relatively inexpensive filler materials.

The curing conditions will vary depending upon the nature of the molding composition employed and the time permitted for curing. With the polyester resin compositions described hereinabove, a curing temperature such as about 150° to 350° F., or higher, but about 190° to 220° F. is desirable. A period of about 2 hours has been found to be satisfactory where curing is effected with live steam as the source of heat. At room temperature as the curing period of from 6 to 48 hours is desirable. I prefer to cure the molding composition at lower temperatures, such as room temperature, because shrinking is minimized. This reduces the formation of internal stresses and prevents fractures. One convenient modification is to conduct the intial stages of curing at the lower temperatures and then heat the article to complete the curing cycle. This will also minimize shrinkage.

I find that it is desirable to first coat the surfaces of the mold with an anti-sticking agent such as Teflon or other material of high surface tension properties. This permits ready release of the casting from the mold.

In order more clearly to disclose the nature of the present invention, specific examples illustrating the present invention will hereinafter be described. It should be understood, however, that this is done solely by way of example and is intended neither to delineate the scope of the invention nor limit the ambit of the appended claims. Parts are expressed in terms of parts by weight.

EXAMPLE 1

Cast Laundry Tub

A molding composition was prepared by first stirring together in a mixing vessel an initial liquid resin mixture having the following composition:

| | Parts |
|---|---|
| Paraplex P–43 (rigid polyester resin containing 30% by weight of styrene monomer) | 13,000 |
| Paraplex P–13 (flexible polyester resin containing 30% by weight of styrene monomer) | 2,000 |
| Styrene monomer | 2,000 |
| Bentone #34 (dimethyldioctadecylammonium bentonite) | 600 |
| Cobalt naphthenate (catalyst) (6% solution) | 225 |
| Dow-Corning Antifoam A (silicone anti-foaming agent) | 85 |
| Methyl ethyl ketone peroxide (catalyst) | 180 |

To the above initial liquid resin mixture there was added 3,000 parts by weight of silica to 1,000 parts by weight of the above liquid resinous component. The silica was a blend of sands of the following particle sizes:

| | By weight, percent |
|---|---|
| Flintshot silica (95% retained on a #40 U.S. standard sieve) | 75 |
| Banding silica (particle size averaging that of #100 U.S. standard sieve) | 20 |
| "E" grade or ultra silica (approximately #200 U.S. standard sieve particle size) | 5 |
| | 100 |

A two-face mold was first assembled to receive its charge of the molding composition prepared above. The mold was of such shape and size as to have a cavity having the shape of a conventional laundry tub 3 feet deep and 2 feet by 2 feet at the top with the sides tapering to a bottom of 2 feet long by 1¾ feet wide. The mold was assembled by placing the internal or male component in an upright assembled position so that the surface of the male face of the mold which corresponded to the internal surface of the bottom of the tub was placed facing upward. A metal drain pipe was positioned on top of the male mold face. Over the male mold face was placed the corresponding female mold face which conformed generally to the configuration of the male component and which provided a cavity which was of a uniform thickness of about ½ inch. That part of the female component of the mold which corresponds to the bottom of the tub was partially cut away so as not to interfere with the positioning of the metal drain pipe and to provide an orifice for pouring the resinous molding composition into the cavity of the assembled mold. The assembled mold was charged with the above molding composition promptly after its formation so that it did not have time to become polymerized. The charged mold was permitted to stand at room temperature for 48 hours, after which the mold was disassembled and the cast laundry tub removed.

The tub was found to be extremely hard and it possessed an extremely high compression and tensile strength and was eminently satisfactory. The surface of the tub was resistant to water and staining.

EXAMPLE 2

Table Top

A molding composition was produced in accordance with the procedure disclosed in Example 1 above. Promptly after the formation of the molding composition it was poured into a rectangular-shaped, open-faced, flat stainless steel mold which had been coated earlier with Teflon (polytetrafluoroethylene) (anti-sticking agent). The mold measured 4 feet by 3 feet and was 1 inch deep. A sufficient charge of molding composition was poured into the open-faced mold to fill it to a depth of about ¾ of an inch. Precautions were taken to maintain the mold in a level horizontal position. The mold and its charge were permitted to stand at room temperature for 48 hours, after which the mold was removed from the cast table top. The table top was found to possess excellent properties.

EXAMPLE 3

Cast Laundry Tub

A solid polyester resin was prepared from 1266 pounds phthalic anhydride, 636 pounds maleic anhydride, 501 pounds dipropylene glycol and 855 pounds of propylene glycol. This resin which possessed an acid number of 35, was admixed with 1.32 pounds of hydroquinone as an inhibitor. This mixture of resin and inhibitor was diluted with 1284 pounds of styrene.

To 52 pounds of this resin, inhibitor and styrene mixture, there were added 1.5 pounds of benzoyl peroxide and 1.5 pounds of methyl ethyl ketone peroxide as well as 1.5 pounds of manganese naphthenate, 0.5 pound of cobalt naphthenate, 4.5 pounds of titanium dioxide (pigment), 1.5 pounds of Bentone 34, 5 pounds of antimony trioxide, 10 pounds of solid chlorinated paraffin and 18 pounds of styrene.

To one pound of the above composition, there was added 3.2 pounds of graded silica sand (of the same composition as in Example 1) and a laundry tub was cast from the resulting mixture in accordance with the process described in Example 1 above.

The tub was found to be extremely hard and it possessed an extremely high compression and tensile strength and was eminently satisfactory. The surface of the tub was resistant to water and staining.

EXAMPLE 4

Floor Tiles

A solid polyester resin was produced as in Example 3, using the same quantities of materials and procedure, and to it were added 1.32 pounds of hydroquinone and the mixture of the resin and hydroquinone inhibitor diluted with 1284 pounds of styrene. To 52 pounds of the resulting resin, inhibitor and styrene mixture, there were added the same quantities of benzoyl peroxide, methyl ethyl ketone peroxide, manganese naphthenate, cobalt naphthenate, titanium dioxide, Bentone 34, antimony trioxide, chlorinated paraffin and styrene as in Example 3. To 1 pound of the resulting composition there were added 3.2 pounds of graded silica sand (of the same composition as in Example 1), and the resulting mixture stirred until a slurry was produced. The slurry was poured into flat square molds of about 8" square and having a draft of ½" until about 1 pound of the slurry forming a layer of about 3/16 of an inch deep had been added to each mold. There was then added over the slurry a layer of about ¼ of an inch thick of dry silica sand weighing about 2 pounds. The sand was composed of about 60% by weight of 25 mesh particle size and about 40% to 80 mesh particle size. The mold and its contents were vibrated for approximately 1 minute, which brought the silica sand into more intimate contact with the wet slurry mixture. Not all of the dry sand, however, became wet at this stage. The molds and their contents were then placed in an oven at 250° F. for about 25 minutes. The molds and their contents were removed from the oven, cooled and the cast floor tiles stripped from the molds. The resulting floor tiles measured about ½" in thickness and showed no indication of warpage. The tiles possessed satisfactory strength and the faces of the tiles did not show any detrimental effect from the addition of the dry sand.

EXAMPLE 5

Floor Tiles

This example illustrates a preferred molding composition according to the invention which reduces warpage in the casting or molding of flat objects, such as floor tiles. This reduction in warpage is obtained by employing a mixture of a flexible type of polyester with a rigid type of polyester. In accordance with this example a mixture of the following composition was prepared:

| | Oz. |
|---|---|
| Styrene | 227 |
| Pigment | 40 |
| Benzoyl peroxide | 20 |
| Flexible polyester resin | 114 |
| Rigid polyester resin (as described in paragraph 1 of Example 3) | 227 |
| Graded silica sand mixture of Example 1 | 684 |
| Colored ceramic coated roofing granules of about 30 mesh size | 57 |

(The flexible polyester resin was prepared from 443 oz. of maleic anhydride, 220 oz. of phthalic anhydride, 219 oz. of adipic acid, 341 oz. of ethylene glycol, and 584 oz. of diethylene glycol. The resulting mixture was diluted with 1809 oz. of styrene.)

The above mixture was produced by adding the graded silica sand to a mixture of the other ingredients and the resulting mixture stirred until a slurry was produced. The mixing container was evacuated to remove occluded air. The slurry was then poured into flat square molds of about 8 in. square having a draft of one-half inch until a layer of slurry slightly less than one-quarter inch was introduced. The molds were then vibrated to distribute the contents of the molds evenly. While still being vibrated there was introduced into each mold about one pound of the same graded sand employed in producing the slurry. By continued vibration of the molds, the added dry sand was gradually wetted by the liquid resin of the slurry due to the wicking and settling action of the sand. The molds and their contents were then placed in an oven at 250° F. until the contents had hardened. The molds and their contents were removed from the oven, cooled, and the resulting cast floor tiles stripped from the molds. The resulting tiles were relatively warp-free and possessed satisfactory strength and an attractive appearance.

It must, of course, be recognized that the articles of various shapes and sizes may be produced in accordance with this invention by varying the mold.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A rigid, monolithic, cast, resinous article comprising the reaction product of an ethylenically unsaturated alkyd resin and a polymerizable vinyl monomer solvent and sand as a filler, the sand being in an amount of from at least about 50% and not over about 90% of the total weight of the resin, monomer solvent and filler by weight, said composition also having present a cation-modified clay in the form of an onium derivative of said clay, said composition being cured to form a rigid, monolithic cast article having a surface which is hard, abrasion-resistant, substantially free of surface imperfections, being resistant to crazing and cracking and free from bubbles.

2. A method of producing a rigid, monolithic, cast, resinous article which comprises placing in a mold a composition comprising an ethylenically unsaturated alkyd resin, a polymerizable vinyl monomer solvent and sand as a filler, the sand being present in an amount at least about 50% and not more than 90% of the total of the resin, monomer and sand by weight, said composition additionally containing as a suspending agent a cation-modified clay in the form of an onium derivative of said clay, and curing the resin composition while in said mold to produce a monolithic cast article having a surface which is hard, abrasion-resistant, substantially free from surface imperfections, being resistant to crazing and cracking and free from bubbles.

References Cited in the file of this patent

UNITED STATES PATENTS

| 1,831,555 | Earl | Nov. 10, 1931 |
|---|---|---|
| 2,514,141 | Phillips | July 4, 1950 |
| 2,534,743 | Vincent | Dec. 19, 1950 |
| 2,622,987 | Ratcliffe | Dec. 23, 1952 |
| 2,645,626 | Nordlanders et al. | July 14, 1953 |
| 2,691,007 | Cass | Oct. 5, 1954 |
| 2,802,797 | Lerch | Aug. 13, 1957 |
| 2,819,238 | Hart et al. | Jan. 7, 1958 |
| 2,830,342 | Meyers et al. | Apr. 15, 1958 |
| 2,852,487 | Maker | Sept. 16, 1958 |
| 2,871,420 | Minter et al. | Jan. 27, 1959 |